(12) United States Patent
Kato et al.

(10) Patent No.: US 7,306,664 B2
(45) Date of Patent: Dec. 11, 2007

(54) INK-JET RECORDING INK, INK-JET RECORDING METHOD, AND INK-JET RECORDING APPARATUS

(75) Inventors: Ryota Kato, Kawasaki (JP); Shoji Koike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 11/095,589

(22) Filed: Apr. 1, 2005

(65) Prior Publication Data

US 2005/0229811 A1 Oct. 20, 2005

(30) Foreign Application Priority Data

Apr. 9, 2004 (JP) ............................. 2004-115598

(51) Int. Cl.
*C09D 11/02* (2006.01)
*B41J 2/01* (2006.01)

(52) U.S. Cl. ................. 106/31.43; 106/31.59; 106/31.75; 106/31.89; 347/100

(58) Field of Classification Search ........... 106/31.43, 106/31.75, 31.59, 31.89; 347/100
See application file for complete search history.

(56) References Cited

U.S. PATENT DOCUMENTS

| | | | | |
|---|---|---|---|---|
| 4,308,061 A * | 12/1981 | Iwahashi et al. | ......... | 106/31.43 |
| 5,082,498 A * | 1/1992 | Kurtz et al. | ................ | 106/499 |
| 5,173,112 A * | 12/1992 | Matrick et al. | ......... | 106/31.43 |
| 5,223,026 A * | 6/1993 | Schwarz, Jr. | ............ | 106/31.43 |
| 5,250,109 A * | 10/1993 | Chan et al. | ............... | 106/31.43 |
| 5,356,464 A * | 10/1994 | Hickman et al. | ........ | 106/31.36 |
| 5,370,731 A * | 12/1994 | Yamashita et al. | ........ | 106/31.43 |
| 5,515,093 A | 5/1996 | Haruta et al. | ................ | 347/101 |
| 5,580,373 A * | 12/1996 | Lane et al. | .................. | 524/100 |
| 5,633,662 A * | 5/1997 | Allen et al. | .................... | 347/15 |
| 5,718,793 A | 2/1998 | Inamoto et al. | ............. | 156/235 |

(Continued)

FOREIGN PATENT DOCUMENTS

JP 61-59911 12/1986

(Continued)

OTHER PUBLICATIONS

Derwent abstract of JP61/108580, May 1986.*

*Primary Examiner*—Helene Klemanski
(74) *Attorney, Agent, or Firm*—Fitzpatrick, Cella, Harper & Scinto

(57) ABSTRACT

An ink jet recording ink containing water and a coloring material, wherein the ink jet recording ink further contains an ethylenediamine compound represented by Formula (I):

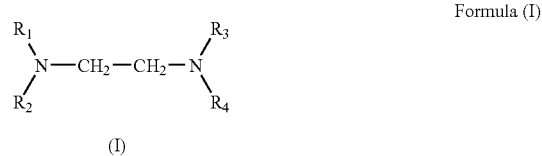

Formula (I)

wherein R1, R2, R3 and R4 are each selected from the group consisting of a hydrogen atom, an alkyl group and an alkylene oxide group, provided that at least one of R1 and R2 and at least one of R3 and R4 are each an alkylene oxide group, and that alkylene oxide units in one molecule are 2 to 20 in total number.

12 Claims, 2 Drawing Sheets

U.S. PATENT DOCUMENTS

| | | | | |
|---|---|---|---|---|
| 5,781,216 | A | 7/1998 | Haruta et al. | 347/106 |
| 5,922,625 | A | 7/1999 | Haruta et al. | 442/75 |
| 6,139,939 | A | 10/2000 | Haruta et al. | 428/195 |
| 6,255,383 | B1* | 7/2001 | Hanzlik | 524/612 |
| 6,281,170 | B1* | 8/2001 | Marsella et al. | 504/362 |
| 6,288,164 | B2* | 9/2001 | Hanzlik | 524/612 |
| 6,497,479 | B1* | 12/2002 | Stoffel et al. | 347/100 |
| 7,033,425 | B2* | 4/2006 | Blease et al. | 106/31.5 |
| 2005/0098063 | A1* | 5/2005 | Lee et al. | 106/31.43 |
| 2005/0229811 | A1 | 10/2005 | Kato et al. | 106/31.43 |

FOREIGN PATENT DOCUMENTS

| | | |
|---|---|---|
| JP | 61-59912 | 12/1986 |
| JP | 61-59914 | 12/1986 |
| JP | 6-157955 | 6/1994 |
| JP | 11-12520 | 1/1999 |

* cited by examiner

INK-JET RECORDING INK, INK-JET RECORDING METHOD, AND INK-JET RECORDING APPARATUS

BACKGROUND OF THE INVENTION

1. Field of the Invention

This invention relates to an ink-jet recording ink (hereinafter often simply "ink") which is suited for ink-jet recording, does not cause any problem of the curling of recording mediums even when water-based inks are applied in a large quantity to cellulose-containing recording mediums, and affords good response and recording-head sticking resistance also when ejected at a high driving frequency.

2. Related Background Art

Ink-jet recording is a process in which small droplets of ink are made to fly to adhere to a recording medium such as paper to perform recording. According to a thermal ink-jet system in which an electricity-heat converter is used as an ejection energy feed means and heat energy is imparted to an ink to generate air bubbles to eject the droplets, its recording head can easily be made into a high-density multi-orifice head, and images with a high resolution and a high quality can be recorded at a high speed (Japanese Patent Publications Nos. S61-59911, S61-59912 and S61-59914).

Now, inks used in ink-jet recording are commonly those which are chiefly composed of water and, incorporated therein, coloring materials, and also water-soluble high-boiling point solvents such as glycols for the purpose of, e.g., preventing drying and improving recording-head sticking resistance. Where images are recorded on a recording medium containing cellulose as typified by plain paper, trace-coated paper or the like by using such inks, the ejecting of inks in a short time in a region of certain amount or more in area causes a problem that a phenomenon of curling (paper warps or rolls) may come. This problem has not come about in conventional recording performed chiefly for characters or letters, which has been prevalent. However, in recording in which inks are applied in a large quantity as in recording internet home page images or photographic images, such a problem is a great subject to be settled.

The droplets of inks ejected through a single ejection orifice have also been made small in size in order to deal with ink-jet recording images having a very high grade on the level of silver salt photography. At present, ink-jet printers of about 5 pl (picoliters) or less in ink droplet quantity have appeared on the market. Also, with regard to recording speed as well, printers have been demanded to be of much higher speed, and, as what is attendant thereon, it is a matter of great urgency to deal with higher driving frequency or improve recording-head sticking resistance.

In settling such subjects, water-based ink compositions containing various kinds of curling-preventive solvents are proposed (Japanese Patent Applications Laid-open Nos. H6-157955 and H11-12520). Although an effect can be seen to a certain extent in respect of curling resistance, a further improvement is demanded in respect of the simultaneous achievement of response in performing ejection at high driving frequency, recording-head sticking resistance, and curling resistance. Here, the respective subjects are outlined below.

1. Curling Resistance:

In applying water-based inks in a large quantity to recording mediums containing cellulose, as typified by plain paper, the phenomenon of what is called "curling" may occur and the paper rolls into cylindrical in some cases.

The mechanism by which the curling occurs is considered due to the fact that, in the step of drying paper in the stage of paper making, the water evaporates in the state a tension is applied to a certain direction to form hydrogen bonds between cellulose molecules. Upon adhesion of a water-based ink to the paper that is in such a state, the hydrogen bonds between cellulose molecules break because of the water and the bonded sites are substituted by the water, whereas, upon evaporation of the water, the hydrogen bonds are again formed between cellulose molecules. It is presumed that, when the hydrogen bonds are again formed, no tension is applied there and hence the paper shrinks on the side to which the ink has adhered, so that the curling occurs.

This phenomenon, which can not easily occur in the recording chiefly of characters or letters where the ink is applied in a small quantity, has come into a serious problem in these days where graphic printing is increasingly frequently performed, and it is demanded to improve curling resistance remarkably. This is of great demand especially in a condition where a water-based ink is ejected to a cellulose-containing recording medium of 15 $cm^2$ or more in recording area and in an ink-application quantity ranging from 0.03 to 30 $mg/cm^2$.

2. Frequency Response:

In an on-demand type ink-jet recording system, an attempt to eject inks continuously at a high driving frequency may make the inks not re-filled in channels in time depending on physical and chemical properties of the inks and inevitably begin to be ejected for the next before the channels are re-filled. As the result, this may cause faulty ejection or bring about a condition where the inks are ejected in a very small quantity. Also, this phenomenon occurs more conspicuously as the droplets of inks ejected are smaller.

3. Sticking Resistance (Resistance to Channel Clogging):

As another problem caused by the evaporation of water content of inks that takes place at channel ends, the clogging of channels may be given which occurs due to the sticking of coloring materials at channel ends because of the evaporation of water content; the sticking being caused, e.g., when a printer is left for a certain period of time without being used, or when, in a printer which is of a type its ink tank and printing head are set integral, the printer is left in the state the head itself is detached from the printer, or when, in a printer which is of a form its ink tank and printing head are set separable, the printer is left in the state the ink tank is detached from the printer.

SUMMARY OF THE INVENTION

For the subjects as stated above that involve future technical trends for a background, the present inventors have energetically made studies on an ink-jet recording printer that can maintain at a high level the basic performance required as inks for ink-jet recording, stated specifically, a good response in performing ink ejection at a high driving frequency (stated specifically, a driving frequency which may exceed 10 kHz) and a good recording-head sticking resistance, without making the curling of recording mediums come into question even in respect to recording mediums containing cellulose, and at the same time can deal with highly minute image recording. They have discovered that an ink which is composed to contain a compound having specific properties can achieve such an aim at a high level, and have accomplished the present invention.

Accordingly, an object of the present invention is to provide an ink-jet recording ink that can maintain at a high level a good response in performing ink ejection at a high driving frequency and a good recording-head sticking resistance, without making the curling come into question even in respect to recording mediums containing cellulose, and at the same time can deal with highly minute image recording.

Another object of the present invention is to provide an ink-jet recording method that enables stable formation of high-grade images.

A further object of the present invention is to provide an ink-jet recording apparatus that is applicable to the above ink-jet recording method.

The above objects of the present invention are achieved by the invention described below. That is, the present invention provides an ink-jet recording ink comprising water and a coloring material, wherein the ink-jet recording ink further contains an ethylenediamine compound represented by Formula (I).

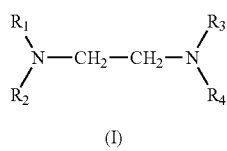

Formula (I)

(I)

wherein $R_1$, $R_2$, $R_3$ and $R_4$ are each selected from the group consisting of a hydrogen atom, an alkyl group and an alkylene oxide group, provided that at least one of $R_1$ and $R_2$ and at least one of $R_3$ and $R_4$ are each an alkylene oxide group, and that alkylene oxide units in one molecule are 2 to 20 in total number.

The present invention is also an ink-jet recording method and an ink-jet recording apparatus which make use of such an ink-jet recording ink.

According to the ink of the present invention, when used in ink-jet recording, it does not make the curling come into question even in respect to the recording mediums containing cellulose, can maintain at a high level the good response in performing ink ejection at a high driving frequency and the good recording-head sticking resistance, and at the same time can deal with highly minute image recording.

As to the response in performing ink ejection at a high driving frequency, it is remarkably effective especially when the thermal ink-jet system is used.

DESCRIPTION OF THE PREFERRED EMBODIMENTS

Figure 1:
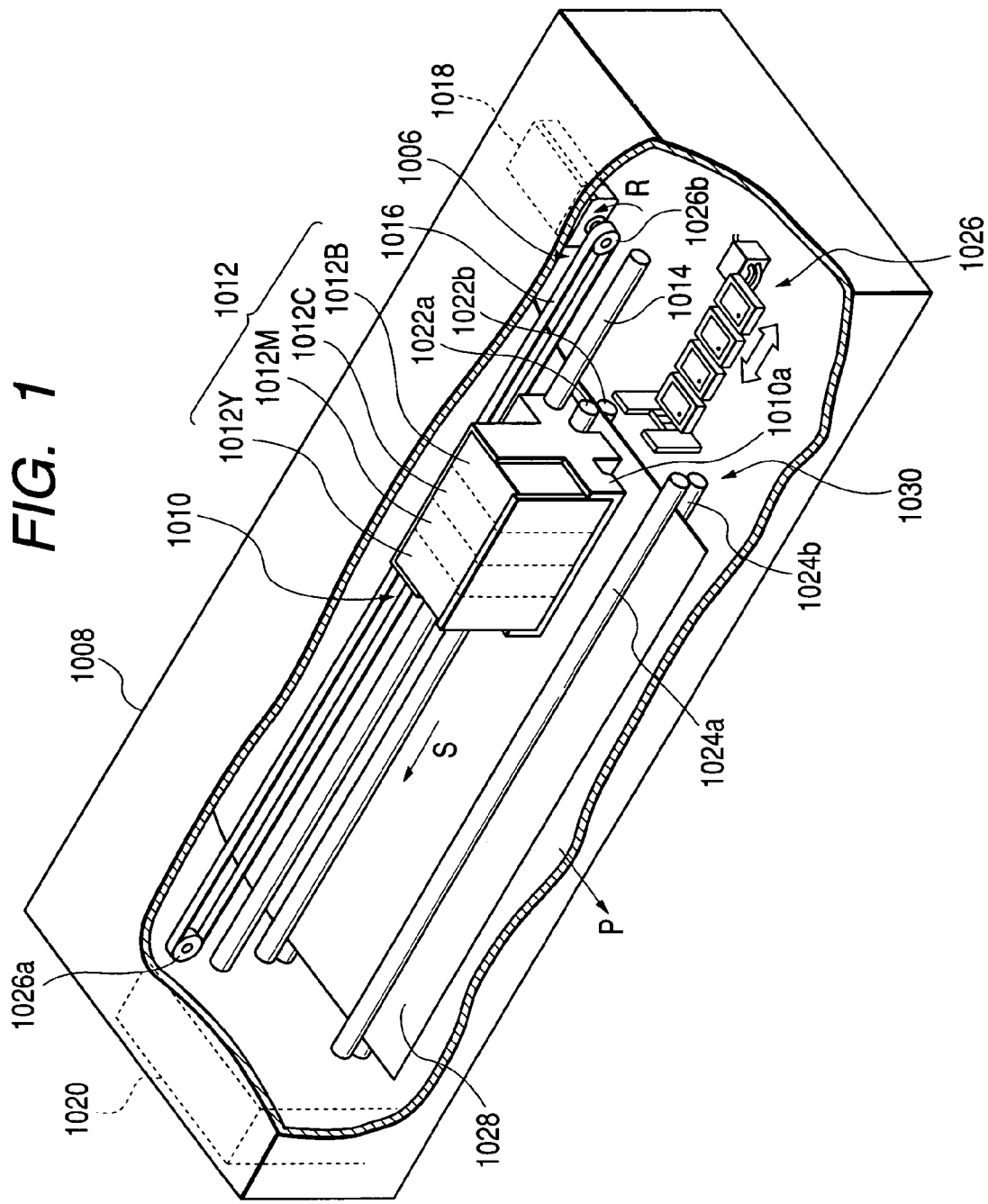
FIG. 1 is a schematic perspective view showing the main part of an example of an ink-jet printer in which a liquid ejection head is mountable.

The present invention is described below in greater detail by giving preferred embodiments.

The ink according to the present invention comprises water, a coloring material, and an ethylenediamine compound represented by Formula (I).

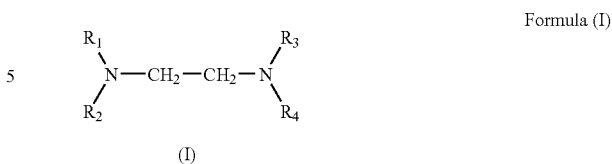

(I)

wherein $R_1$, $R_2$, $R_3$ and $R_4$ are each selected from the group consisting of a hydrogen atom, an alkyl group and an alkylene oxide group, provided that at least one of $R_1$ and $R_2$ and at least one of $R_3$ and $R_4$ are each an alkylene oxide group, and that alkylene oxide units in one molecule are 2 to 20 in total number.

In the ethylenediamine compound represented by Formula (I), $R_1$, $R_2$, $R_3$ and $R_4$ are each selected from the group consisting of a hydrogen atom, an alkyl group and an alkylene oxide group. The alkyl group in the present invention may include, but is not particularly limited to, a methyl group, an ethyl group and a propyl group, and may be imparted in the range where the compound is well soluble in the ink (water+solvent). The alkylene oxide group is a group having alkylene oxide units. Such alkylene oxide units may preferably be at least one of an ethylene oxide unit and a propylene oxide unit, which are specifically represented by the following structural formula.

Ethylene Oxide Unit:

Propylene Oxide Unit:

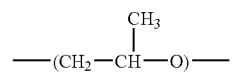

The compound represented by Formula (I) as used in the present invention has, for such alkylene oxide units, 2 to 20 units in one molecule. If the number of alkylene oxide units added is more than 20, although the curling may be restrained to a certain extent, the ink may have so high a viscosity that the ink may not be re-filled in channels in time when ejected continuously at a high driving frequency, and may inevitably begin to be ejected for the next before the channels are re-filled, to cause faulty ejection and result in a poor response in performing what is called the ink ejection at a high driving frequency. If on the other hand the number of alkylene oxide units added is less than 2, the effect of restraining the curling is not obtainable.

The ethylenediamine compound in which 2 to 20 alkylene oxide units are added as used in the present invention may variously be synthesized by conventional methods. It may include, e.g., those each having a structure wherein $R_1$, $R_2$, $R_3$ and $R_4$ are represented by any of (A) to (H) shown in Table 1. Specific compounds may include, but are not limited to, compounds (1) to (14) shown in Table 2.

Incidentally, in the present invention, what is meant by "alkylene oxide units are 2 to 20 in total number in one molecule" is that the alkylene oxide units the $R_1$ to $R_4$ in Formula (I) have are 2 to 20 in total. For example, in Compound (1) shown in Table 2, one ethylene oxide unit and one propylene oxide unit are added to each of $R_1$ to $R_4$, and therefore the alkylene oxide units in one molecule are 8 in total.

TABLE 1

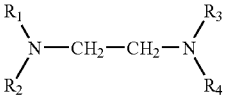  (I)

  (A)

  (B)

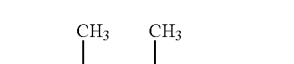  (C)

  (D)

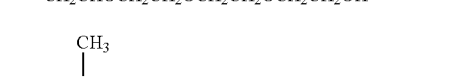  (E)

—CH$_2$CH$_2$OCH$_2$CH$_2$OCH$_2$CH$_2$OH  (F)

—CH$_2$CH$_2$OCH$_2$CH$_2$OCH$_2$CH$_2$OCH$_2$CH$_2$OCH$_2$CH$_2$OH  (G)

—H  (H)

TABLE 2

| | $R_1$ | $R_2$ | $R_3$ | $R_4$ |
|---|---|---|---|---|
| Compound (1) | (A) | (A) | (A) | (A) |
| Compound (2) | (A) | (H) | (A) | (H) |
| Compound (3) | (B) | (B) | (B) | (B) |
| Compound (4) | (B) | (B) | (B) | (H) |
| Compound (5) | (C) | (C) | (C) | (H) |
| Compound (6) | (C) | (H) | (C) | (H) |
| Compound (7) | (D) | (D) | (D) | (D) |
| Compound (8) | (D) | (D) | (D) | (H) |
| Compound (9) | (E) | (E) | (E) | (E) |
| Compound (10) | (E) | (H) | (E) | (E) |
| Compound (11) | (F) | (F) | (F) | (F) |
| Compound (12) | (F) | (H) | (F) | (F) |
| Compound (13) | (G) | (G) | (G) | (G) |
| Compound (14) | (G) | (H) | (G) | (H) |

The compound of Formula (I) as used in the present invention may be in a content of from 0.5 to 40% by weight, preferably from 1 to 35% by weight, and more preferably from 2 to 30% by weight, based on the total weight of the ink.

(Aqueous Medium)

The ink according to the present invention contains water as an essential component. The water in the ink may preferably be in a content of 30% by weight or more and also preferably 95% by weight or less, based on the total weight of the ink. Also, an aqueous medium in which the water and a water-soluble solvent are used in combination may often be used.

Such a constituent material used in combination with the water may include, e.g., alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol and n-pentanol; amides such as dimethylformamide and dimethylacetamide; ketones or keto alcohols such as acetone and diacetone alcohol; ethers such as tetrahydrofuran and dioxane; oxyethylene or oxypropylene polymers such as diethylene glycol, triethylene glycol, tetraethylene glycol, dipropylene glycol, tripropylene glycol, polyethylene glycol and polypropylene glycol; alkylene glycols the alkylene group of which has 2 to 6 carbon atoms, such as ethylene glycol, propylene glycol, trimethylene glycol, 1,4-butanediol and 1,5-pentanediol; triols such as 1,2,6-hexanetriol, glycerol, and trimethylol propane; lower alkyl ethers of glycols, such as ethylene glycol monomethyl (or -ethyl) ether, diethylene glycol monomethyl (or -ethyl) ether and triethylene glycol monomethyl (or -ethyl) ether; lower dialkyl ethers of polyhydric alcohols, such as triethylene glycol dimethyl (or -ethyl) ether and tetraethylene glycol dimethyl (or -ethyl) ether; alkanolamines such as monoethanolamine, diethanolamine and triethanolamine; and Sulfolane, N-methyl-2-pyrrolidone, 2-pyrrolidone, 1,3-dimethyl-2-imidazolidinone, urea, ethylene urea, bishydroxyethyl sulfone, and diglycerol. In particular, ethylene glycol, polyethylene glycol (average molecular weight: 200 to 1,000), glycerol, 1,2,6-hexanetriol, ethylene urea or trimethylol propane may preferably be used. In particular, ethylene urea is most preferred.

In the ink according to the present invention, there are no particular limitations on the type and content of the water-soluble solvent used in combination with the water. It may preferably be in a content of, e.g., from 3% by weight or more and also preferably 60% by weight or less, based on the total weight of the ink.

(Surface-Active Agent)

In the ink according to the present invention, in order to achieve more well-balanced ejection stability, it is preferable for the ink to contain a surface-active agent. In particular, the use of a nonionic surface-active agent is preferred. Among the nonionic surface-active agents, polyoxyethylene alkyl ethers and ethylene oxide adducts of acetylene glycol are particularly preferred. The HLB (hydrophilic-lipophilic balance) value of these nonionic surface-active agents is 10 or more. The surface-active agent thus used in combination may be in a content of from 0.01 to 5% by weight, preferably from 0.05 to 4% by weight, and more preferably from 0.1 to 3% by weight, based on the total weight of the ink.

(Other Additives)

In the ink according to the present invention, in order to make up an ink having the desired values of physical properties, a viscosity modifier, an anti-foaming agent, an antiseptic agent, a mildewproofing agent, an antioxidant and so forth may optionally be added as additives, in addition to the components described above. The additives may preferably be so selected that the ink has a surface tension of 25 mN/m or more, and preferably 28 mN/m or more.

(Coloring Material)

As for the coloring material to be contained in the ink according to the present invention, a dye and a pigment may be used. It may be added to the ink in an amount of, but not limited to the range of, from 0.1 to 15% by weight, preferably from 0.2 to 12% by weight, and more preferably from 0.3 to 10% by weight, based on the total weight of the ink.

As the dye, usable are almost all of water-soluble acid dyes, direct dyes, basic dyes and reactive dyes described in Color Index. Also, even those not described in Color Index may be used as long as they are water-soluble dyes.

Specific examples of the dye used in the present invention are given below. The present invention is by no means limited to these.

Dyes used in yellow inks may include, e.g., C.I. Direct Yellow 173, 142, 144, 86, 132, and C.I. Acid Yellow 23, 17.

Dyes used in magenta inks may include, e.g., C.I. Acid Red 92, 289, 35, 37, 52.

Dyes used in cyan inks may include, e.g., C.I. Acid Blue 9, 7, 103, 1, 90, and C.I. Direct Blue 86, 87, 199.

Dyes used in black inks may include, e.g., C.I. Food Black 2, and C.I. Direct Black 52, 154, 195.

In the present invention, a pigment may also be used. A pigment used in black inks may preferably be carbon black. Carbon black pigment used in black ink may include, e.g. furnace black, lamp black, acetylene black and channel black. Those having a primary particle diameter of from 15 to 40 nm, a specific surface area of from 50 to 300 $m^2/g$ as measured by the BET method, a DBP oil absorption of from 40 to 150 ml/100 g, and a volatile content of from 0.5 to 10% by weight.

Pigments used in color inks may preferably be organic pigments. Stated specifically, what may be exemplified are insoluble azo pigments such as Toluidine Red, Toluidine Maroon, Hansa Yellow, Benzidine Yellow and Pyrazolone Red; water-soluble azo pigments such as Lithol Red, Herio Bordeaux, Pigment Scarlet and Permanent Red 2B; derivatives from vat dyes, such as alizarin, indanthrone and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; thioindigo pigments; condensation azo pigments; thioindigo pigments; diketopyrrolopyrrole pigments; and pigments such as Flavanthrone Yellow, Acylamide Yellow, Quinophthalone Yellow, Nickel Azo Yellow, Copper Azomethine Yellow, Perinone Orange, Anthrone Orange, Dianthraquinonyl Red and Dioxazine Violet.

To show the organic pigments by Color Index (C.I.) Number, those shown below may be exemplified.

C.I. Pigment Yellow: 12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, 185;

C.I. Pigment Orange: 16, 36, 43, 51, 55, 59, 61, 71;

C.I. Pigment Red: 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, 272;

C.I. Pigment Violet: 19, 23, 29, 30, 37, 40, 50;

C.I. Pigment Blue: 15, 15:1, 15:3, 15:4, 15:6, 22, 60, 64;

C.I. Pigment Green: 7, 36; and

C.I. Pigment Brown: 23, 25, 26.

Those other than the above pigments may also be used. Of these pigments, particularly preferred are the following:

C.I. Pigment Yellow: 13, 17, 55, 74, 93, 97, 98, 110, 128, 139, 147, 150, 151, 154, 155, 180, 185, C.I. Pigment Red: 122, 202, 209; and C.I. Pigment Blue: 15:3, 15:4.

(Dispersing Agent)

As to a dispersing agent used in dispersing the pigment, there are no particular limitations thereon as long as it is water-soluble. Stated specifically, it may include block copolymers, random copolymers or graft copolymers composed of at least two monomers selected from styrene, styrene derivatives, vinylnaphthalene, vinylnaphthalene derivatives, and alcohol esters of α,β-ethylenically unsaturated carboxylic acids, and also acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamides, and derivatives of these (at least one of these is a hydrophilic monomer); or salts of these copolymers. In particular, dispersing agents especially preferable in order to practicing the present invention are block copolymers. Especially when in a head making use of thermal energy the head is driven at a high driving frequency of, e.g., 10 kHz or more, the use of such a block copolymer in the present invention makes more remarkable the effect of improving ejection performance.

The dispersant in the ink may preferably be in a content within the range of from 0.5 to 10% by weight, preferably from 0.8 to 8% by weight, and more preferably from 1 to 6% by weight, based on the total weight of the ink. If the dispersant is in a content beyond this range, it is difficult to maintain the desired ink viscosity.

(Recording Apparatus)

The ink-jet recording apparatus according to the present invention is described next, taking the case of an ink-jet printer as a specific example. FIG. 1 is a schematic perspective view showing a liquid ejection head as a liquid ejection head of an ejection system in which air bubbles communicate with the atmosphere at the time of ejection, and the main part of an example of an ink-jet printer which is a liquid ejection apparatus making use of this head.

In FIG. 1, the ink-jet printer is constituted to comprise i) a transporting assembly 1030 which is provided in a casing 1008 in its lengthwise direction and transports a sheet 1028 intermittently in the direction shown by an arrow P in the drawing, which sheet is used as a recording medium, ii) a recording part 1010 which is reciprocated substantially in parallel to and along a guide shaft 1014, in the arrow S direction substantially falling at right angles with the direction P in which the sheet 1028 is transported by the transporting assembly 1030, and iii) a movement driving part 1006 as a driving means which reciprocates the recording part 1010.

The transporting assembly 1030 has a pair of roller units 1022a and 1022b and a pair of roller units 1024a and 1024b which are both disposed opposingly substantially in parallel to each other, and a driving part 1020 for driving each of these roller units. With such construction, the driving part 1020 of the transporting assembly 1030 is brought into the state of operation, whereupon the sheet 1028 comes to be held between the respective roller units 1022a and 1022b and roller units 1024a and 1024b and be transported in intermittent feed in the direction of an arrow P. The movement driving part 1006 is constituted to comprise a belt 1016 put around over a pulley 1026a and a pulley 1026b which are respectively provided on rotating shafts disposed opposingly at a given distance, and a motor 1018 which drives the belt 1016 in the regular direction and the reverse direction; the belt 1016 being disposed substantially in parallel to the roller units 1022a and 1022b and connected to a carriage member 1010a of the recording part 1010.

At the time the motor 1018 is brought into the state of operation and the belt 1016 is rotated in the direction of an arrow R, the carriage member 1010a of the recording part 1010 is moved in the direction of an arrow S by the stated amount of movement. Also, at the time the motor 1018 is brought into the state of operation and the belt 1016 is rotated in the direction reverse to the direction of an arrow R shown in the drawing, the carriage member 1010a of the recording part 1010 comes to be moved in the direction reverse to the direction of an arrow S by the stated amount of movement. Further, at one end of the movement driving part 1006, a restoration unit 1026 for performing ejection restoration of the recording part 1010 is provided opposingly to an ink ejection orifice array of the recording part 1010, at a position serving as the home position of the carriage member 1010a.

In the recording part 1010, ink-jet cartridges (hereinafter often simply "cartridge(s)") 1012Y, 1012M, 1012C and 1012B are each provided detachably to the carriage member 1010a for each color, e.g., yellow, magenta, cyan and black.

Figure 2:
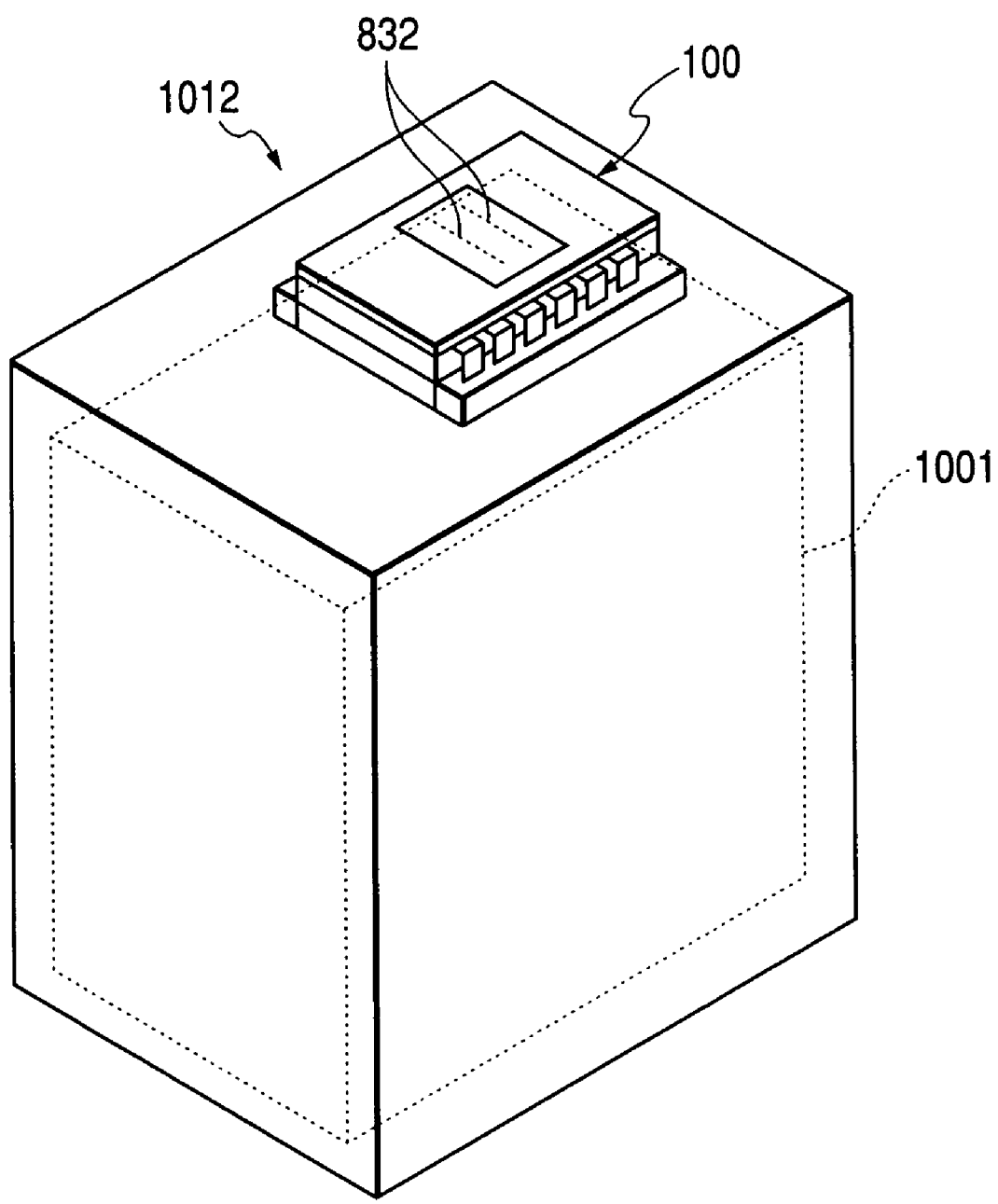
FIG. 2 is a schematic perspective view showing an example of an ink-jet cartridge having a liquid ejection head.

FIG. 2 shows an example of an ink-jet cartridge mountable to the ink-jet recording apparatus described above. A cartridge 1012 in the example shown in the drawing is of a serial type, and its main part is constituted of an ink-jet recording head 100 and an ink tank 1001 which holds inks therein.

In the ink-jet recording head (liquid ejection head) 100, a large number of ejection orifices 832 for ejecting inks therethrough are formed, and are so set up that the inks are led from the ink tank 1001 to a common liquid chamber (not shown) of the liquid ejection head 100 via ink feed channels (not shown). The cartridge 1012 shown in FIG. 2 is one in which the ink-jet recording head 100 and the ink tank 1001 are integrally formed so that liquids can be replenished into the ink tank 1001 as occasion calls. It may instead have a structure in which the ink tank 1001 is replaceably connected to the liquid ejection head 100. Incidentally, the ink-jet cartridge having the ink-jet recording head is a recording unit.

EXAMPLES

The present invention is described below in greater detail by giving Examples and Comparative Examples. In the following, "%" is by weight unless particularly noted.

Example 1

(Preparation of Pigment Dispersion Solution 1)

First, using benzyl methacrylate and methacrylic acid as raw materials, an AB type block polymer having an acid value of 250 and a weight-average molecular weight of 3,000 was produced by a conventional method, which was further neutralized with an aqueous potassium hydroxide solution and then diluted with ion-exchanged water to prepare a homogeneous aqueous 50% by weight polymer solution. Then, 180 g of the aqueous polymer solution obtained, 100 g of C.I. Pigment Blue 15:3 and 220 g of ion-exchanged water were mixed, and then these were stirred for 0.5 hour by a mechanical means. Subsequently, using Microfluidizer (registered trademark; a high shear processor manufactured by MFIC Corporation), the resultant mixture was processed by passing it five times through the interior of an interaction chamber under application of a liquid pressure of about 10,000 psi (about 70 MPa). Further, the pigment dispersion solution obtained as described-above was subjected to centrifugation processing (at 12,000 rpm for 20 minutes) to remove non-dispersible matter which contained coarse particles. Thus, cyan color Pigment Dispersion Solution 1 was obtained. Pigment Dispersion Solution 1 thus obtained was in a pigment concentration of 10% by weight and a dispersant concentration of 10% by weight.

(Preparation of Ink 1)

To prepare Ink 1, the cyan color Pigment Dispersion Solution 1 obtained as described above was used in the amount shown below, and the other components as shown below were added thereto so as to be in the stated concentrations. These components were sufficiently mixed and stirred, followed by pressure filtration with a micro-filter of 2.5 μm in pore size (available from Fuji Photo Film Co., Ltd.) to prepare Ink 1, having a pigment concentration of 2% by weight and a dispersant concentration of 2% by weight.

| | |
|---|---|
| Pigment Dispersion Solution 1 | 20% by weight |
| Compound (1) | 20% by weight |
| Ethylene urea | 2% by weight |
| Ethylene oxide adduct of acetylene glycol | 0.5% by weight |
| (trade name: ACETYLENOL EH, available from Kawaken Fine Chemicals Co., Ltd.) | |
| Polyoxyethylene cetyl ether | 1% by weight |
| (the number of alkylene oxide units added: 30; HLB: 19.5) | |
| Ion-exchanged water | 56.5% by weight |

Example 2

(Preparation of Pigment Dispersion Solution 2)

100 g of the same aqueous polymer solution as that used in Preparation of Pigment Dispersion Solution 1, 100 g of C.I. Pigment Red 122 and 300 g of ion-exchanged water were mixed, and then these were stirred for 0.5 hour by a mechanical means. Subsequently, using Microfluidizer, the resultant mixture was processed by passing it five times through the interior of an interaction chamber under application of a liquid pressure of about 10,000 psi (about 70 MPa). Further, the pigment dispersion solution obtained as described above was subjected to centrifugation processing (at 12,000 rpm for 20 minutes) to remove non-dispersible matter which contained coarse particles. Thus, magenta color Pigment Dispersion Solution 2 was obtained. Pigment Dispersion Solution 2 thus obtained was in a pigment concentration of 10% by weight and a dispersant concentration of 5% by weight.

(Preparation of Ink 2)

To prepare Ink 2, the above magenta color Pigment Dispersion Solution 2 was used in the amount shown below, and the other components as shown below were added thereto so as to be in the stated concentrations. These components were sufficiently mixed and stirred, followed by pressure filtration with a micro-filter of 2.5 μm in pore size (available from Fuji Photo Film Co., Ltd.) to prepare Ink 2, having a pigment concentration of 4.5% by weight and a dispersant concentration of 2.25% by weight.

| | |
|---|---|
| Pigment Dispersion Solution 2 | 45% by weight |
| Compound (4) | 12% by weight |
| Polyethylene glycol (average molecular weight: 300) | 6% by weight |
| Ethylene urea | 2% by weight |
| Ethylene oxide adduct of acetylene glycol | 0.5% by weight |
| (trade name: ACETYLENOL EH, available from Kawaken Fine Chemicals Co., Ltd.) | |
| Ion-exchanged water | 34.5% by weight |

Example 3

(Preparation of Pigment Dispersion Solution 3)

First, using benzyl acrylate and methacrylic acid as raw materials, an AB type block polymer having an acid value of 300 and a weight-average molecular weight of 4,000 was produced by a conventional method, which was further neutralized with an aqueous potassium hydroxide solution and then diluted with ion-exchanged water to prepare a homogeneous aqueous 50% by weight polymer solution. Then, 110 g of the above aqueous polymer solution, 100 g of C.I. Pigment Yellow 128 and 290 g of ion-exchanged water were mixed, and then these were stirred for 0.5 hour by a mechanical means. Subsequently, using Microfluidizer, the resultant mixture was processed by passing it five times through the interior of an interaction chamber under application of a liquid pressure of about 10,000 psi (about 70 MPa). Further, the pigment dispersion solution obtained as described above was subjected to centrifugation processing (at 12,000 rpm for 20 minutes) to remove non-dispersible matter which contained coarse particles. Thus, Pigment Dispersion Solution 3 was obtained. Pigment Dispersion Solution 3 thus obtained was in a pigment concentration of 10% by weight and a dispersant concentration of 6% by weight.

(Preparation of Ink 3)

To prepare Ink 3, the above cyan color Pigment Dispersion Solution 3 was used in the amount shown below, and the other components as shown below were added thereto so as to be in the stated concentrations. These components were sufficiently mixed and stirred, followed by pressure filtration with a micro-filter of 2.5 μm in pore size (available from Fuji Photo Film Co., Ltd.) to prepare Ink 3, having a pigment concentration of 5% by weight and a dispersant concentration of 3% by weight.

| | |
|---|---|
| Pigment Dispersion Solution 3 | 50% by weight |
| Compound (8) | 10% by weight |
| 1,2,6-Hexanetriol | 10% by weight |
| Ethylene glycol | 1% by weight |
| Ethylene oxide adduct of acetylene glycol (trade name: ACETYLENOL EH, available from Kawaken Fine Chemicals Co., Ltd.) | 0.5% by weight |
| Polyoxyethylene cetyl ether (the number of alkylene oxide units added: 30; HLB: 19.5) | 0.5% by weight |
| Ion-exchanged water | 28% by weight |

Example 4

(Preparation of Pigment Dispersion Solution 4)

First, using benzyl methacrylate, methacrylic acid and ethoxyethylene glycol methacrylate as raw materials, an ABC type block polymer having an acid value of 350 and a weight-average molecular weight of 5,000 was produced by a conventional method, which was further neutralized with an aqueous potassium hydroxide solution and then diluted with ion-exchanged water to prepare a homogeneous aqueous 50% by weight polymer solution. Then, 60 g of the above aqueous polymer solution, 100 g of carbon black and 340 g of ion-exchanged water were mixed, and then these were stirred for 0.5 hour by a mechanical means. Subsequently, using Microfluidizer, the resultant mixture was processed by passing it five times through the interior of an interaction chamber under application of a liquid pressure of about 10,000 psi (about 70 MPa). Further, the pigment dispersion solution obtained as described above was subjected to centrifugation processing (at 12,000 rpm for 20 minutes) to remove non-dispersible matter which contained coarse particles. Thus, black color Pigment Dispersion Solution 4 was obtained. Pigment Dispersion Solution 4 thus obtained was in a pigment concentration of 10% by weight and a dispersant concentration of 3.5% by weight.

(Preparation of Ink 4)

To prepare Ink 4, the above black color Pigment Dispersion Solution 4 was used in the amount shown below, and the other components as shown below were added thereto so as to be in the stated concentrations. These components were sufficiently mixed and stirred, followed by pressure filtration with a micro-filter of 2.5 μm in pore size (available from Fuji Photo Film Co., Ltd.) to prepare Ink 4, having a pigment concentration of 3% by weight and a dispersant concentration of 1.05% by weight.

| | |
|---|---|
| Pigment Dispersion Solution 4 | 30% by weight |
| Compound (11) | 8% by weight |
| Trimethylolpropane | 6% by weight |
| Polyethylene glycol (average molecular weight: 200) | 4% by weight |
| Polyoxyethylene cetyl ether (the number of alkylene oxide units added: 30; HLB: 19.5) | 2% by weight |
| Ion-exchanged water | 50% by weight |

Example 5

(Preparation of Ink 5)

To a mixture solution of ion-exchanged water and an aqueous medium, C.I. Direct Blue 199 and other components as shown below were added with stirring, and these were sufficiently mixed and stirred, followed by pressure filtration with a micro-filter of 2.5 μm in pore size (available from Fuji Photo Film Co., Ltd.) to prepare Ink 5.

| | |
|---|---|
| C.I. Direct Blue 199 | 4% by weight |
| Compound (5) | 10% by weight |
| Diglycerol | 10% by weight |
| Ethylene oxide adduct of acetylene glycol (trade name: ACETYLENOL EH, available from Kawaken Fine Chemicals Co., Ltd.) | 0.7% by weight |
| Ion-exchanged water | 75.3% by weight |

Example 6

(Preparation of Ink 6)

To a mixture solution of ion-exchanged water and an aqueous medium, C.I. Acid Red 52 and other components as shown below were added with stirring, and these were sufficiently mixed and stirred, followed by pressure filtration with a micro-filter of 2.5 μm in pore size (available from Fuji Photo Film Co., Ltd.) to prepare Ink 6.

| | |
|---|---|
| C.I. Acid Red 52 | 3% by weight |
| Compound (9) | 15% by weight |
| Ethylene urea | 0.5% by weight |
| Ethylene oxide adduct of acetylene glycol (trade name: ACETYLENOL EH, available from Kawaken Fine Chemicals Co., Ltd.) | 0.5% by weight |
| Ion-exchanged water | 81% by weight |

Example 7

(Preparation of Ink 7)

To a mixture solution of ion-exchanged water and an aqueous medium, C.I. Direct Yellow 132 and other components as shown below were added with stirring, and these were sufficiently mixed and stirred, followed by pressure filtration with a micro-filter of 2.5 μm in pore size (available from Fuji Photo Film Co., Ltd.) to prepare Ink 7.

| | |
|---|---|
| C.I. Direct Yellow 132 | 3% by weight |
| Compound (13) | 4% by weight |
| Bishydroxyethyl sulfone | 9% by weight |
| Polyethylene glycol (average molecular weight: 300) | 5% by weight |
| Ethylene oxide adduct of acetylene glycol (trade name: ACETYLENOL EH, available from Kawaken Fine Chemicals Co., Ltd.) | 0.3% by weight |
| Ion-exchanged water | 78.7% by weight |

Example 8

(Preparation of Ink 8)

To a mixture solution of ion-exchanged water and an aqueous medium, C.I. Food Black 2 and other components as shown below were added with stirring, and these were sufficiently mixed and stirred, followed by pressure filtration with a micro-filter of 2.5 μm in pore size (available from Fuji Photo Film Co., Ltd.) to prepare Ink 8.

| | |
|---|---|
| C.I. Food Black 2 | 2.5% by weight |
| Compound (2) | 25% by weight |
| Ethylene oxide adduct of acetylene glycol (trade name: ACETYLENOL EH, available from Kawaken Fine Chemicals Co., Ltd.) | 1.0% by weight |
| Ion-exchanged water | 71.5% by weight |

Example 9

(Preparation of Ink 9)

Ink 9 was obtained in the same manner as in Example 5 except that the ethylene oxide adduct of acetylene glycol in Example 5 was removed to give the following composition.

| | |
|---|---|
| C.I. Direct Blue 199 | 4% by weight |
| Compound (5) | 10% by weight |
| Diglycerol | 10% by weight |
| Ion-exchanged water | 76% by weight |

Comparative Example 1

(Preparation of Ink 10)

Ink 10 was obtained in the same manner as in Example 1 except that Compound (1) in Example 1 was changed for ethylenediamine to give the following composition.

| | |
|---|---|
| Pigment Dispersion Solution 1 | 20% by weight |
| Ethylenediamine | 20% by weight |
| Ethylene urea | 2% by weight |
| Ethylene oxide adduct of acetylene glycol (trade name: ACETYLENOL EH, available from KawakenFine Chemicals Co., Ltd.) | 0.5% by weight |
| Polyoxyethylene cetyl ether (the number of alkylene oxide units added: 30; HLB: 19.5) | 1% by weight |
| Ion-exchanged water | 56.5% by weight |

Comparative Example 2

(Preparation of Ink 11)

Ink 11 was obtained in the same manner as in Example 2 except that Compound (4) in Example 2 was changed for Compound (15) to give the following composition.

| | |
|---|---|
| Pigment Dispersion Solution 2 | 45% by weight |
| Compound (15) | 12% by weight |
| Polyethylene glycol (average molecular weight: 300) | 6% by weight |
| Ethylene urea | 2% by weight |
| Ethylene oxide adduct of acetylene glycol (trade name: ACETYLENOL EH, available from Kawaken Fine Chemicals Co., Ltd.) | 0.5% by weight |
| Ion-exchanged water | 34.5% by weight |

Compound (15):

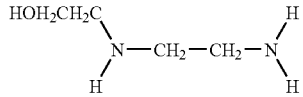

(15)

Comparative Example 3

(Preparation of Ink 12)

Ink 12 was obtained in the same manner as in Example 8 except that Compound (2) in Example 8 was changed for trimethylolpropane to give the following composition.

| | |
|---|---|
| C.I. Food Black 2 | 2.5% by weight |
| Trimethylolpropane | 25% by weight |
| Ethylene oxide adduct of acetylene glycol (trade name: ACETYLENOL EH, available from Kawaken Fine Chemicals Co., Ltd.) | 1% by weight |
| Ion-exchanged water | 71.5% by weight |

Comparative Example 4

(Preparation of Ink 13)

Ink 13 was obtained in the same manner as in Example 6 except that Compound (9) in Example 6 was changed for Compound (16) to give the following composition.

| | |
|---|---|
| C.I. Acid Red 52 | 3% by weight |
| Compound (16) | 15% by weight |
| Ethylene urea | 0.5% by weight |
| Ethylene oxide adduct of acetylene glycol (trade name: ACETYLENOL EH, available from Kawaken Fine Chemicals Co., Ltd.) | 0.5% by weight |
| Ion-exchanged water | 81% by weight |

Compound (16):

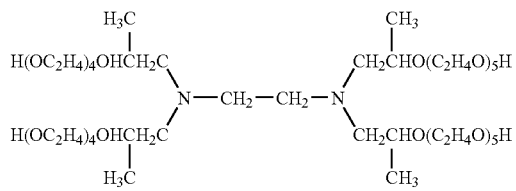

Evaluation

The inks obtained in Examples 1 to 9 (Inks 1 to 9) and those in Comparative Examples 1 to 4 (Inks 10 to 13) were evaluated in the following way. An ink-jet recording apparatus (a printer) used in evaluation items (2) and (3) had the construction shown in FIG. 1. Incidentally, its recording head had a recording density of 1,200 dpi, and was 4 pl in ejection volume per dot.

Evaluation Items (1) Frequency Response:

Using an ink-jet recording head evaluation instrument manufactured by CANON INC., ink was ejected at a driving frequency of 0.1 kHz. The driving frequency was made gradually higher, and the driving frequency was measured at a point of time where, as the shape of ejection, any primary droplet is no longer present and the ejection became unstable in shape, to make judgment.

A: More than 10 kHz.
B: 5 kHz or more to 10 kHz or less.
C: Less than 5 kHz.

(2) Sticking Resistance:

The head mounted to the printer was detached from the main body and left for a week in an environment of 35° C. temperature and 10% relative humidity. Thereafter, it was attached to the printer to check whether or not the printing was recoverable by usual recovery action. Evaluation criteria are as follows. The results of evaluation are shown in Table 3 below.

A: Recovered by main-body recovery action taken once.
B: Recovered by main-body recovery action taken few times.
C: Not recovered by main-body recovery action.

(3) Curling Resistance:

Solid printing was performed on A4-size SW-101 paper manufactured by CANON INC. but leaving blanks at the four sides of the paper by 2 cm each in width. The recorded matter obtained was placed in an environment of 25° C./55% RH, and its condition was visually observed after 1 hour and after a day to make evaluation. Evaluation criteria are as follows. The results of evaluation are shown in Table 3 below.

A: The paper is substantially kept flat.
B: The paper has risen at edge portions.
C: The paper stood cylindrical.

TABLE 3

| | Evaluation item | | Evaluation item (3) | |
|---|---|---|---|---|
| | (1) | (2) | After 1 hour | After a day |
| Example: | | | | |
| 1 Ink 1 | A | A | A | A |
| 2 Ink 2 | A | A | A | A |
| 3 Ink 3 | A | A | A | A |
| 4 Ink 4 | A | A | A | A |
| 5 Ink 5 | A | A | A | A |
| 6 Ink 6 | A | A | A | A |
| 7 Ink 7 | A | A | A | A |
| 8 Ink 8 | A | A | A | A |
| 9 Ink 9 | B | A | A | A |
| Comparative Example: | | | | |
| 1 Ink 10 | A | A | C | C |
| 2 Ink 11 | A | A | B | C |
| 3 Ink 12 | B | C | A | A |
| 4 Ink 13 | C | B | A | A |

From the results of evaluation (1) to (3) as shown in the above Table 3, it has been confirmed that Inks 1 to 8 according to Examples 1 to 8 are all those having good ink-jet ejection suitability and good curling resistance. Also, in Example 9, the ink contains the compound of Formula (I) but contains no surface-active agent, and hence, although it shows good curling resistance, its response in performing ejection at a high driving frequency is a little inferior to the inks according to Examples 1 to 8 containing the surface-active agent. On the other hand, from the results in Comparative Examples 1 and 2, it has been confirmed that the inks containing compounds in which the number of alkylene oxide units added, of the ethylenediamine is less than 2 have insufficient curling resistance. Also, from the results in Comparative Example 4, it has been confirmed that, although the ink containing the compound in which 20 or more alkylene oxide units are added have good curling resistance, there is a problem on the response in performing ejection at a high driving frequency.

This application claims priority from Japanese Patent Application No. 2004-115598 filed Apr. 9, 2004, which is hereby incorporated by reference herein.

What is claimed is:

1. An ink-jet recording method comprising ejecting an ink-jet recording ink to a recording medium,
wherein an ejection volume is 5 pl or less per dot,
wherein the ink-jet recording ink comprises water, a coloring material, and an ethylenediamine compound represented by Formula (I):

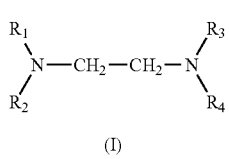

wherein $R_1$, $R_2$, $R_3$ and $R_4$ are each selected from the group consisting of a hydrogen atom, an alkyl group and an alkylene oxide group, provided that at least one of $R_1$ and $R_2$ and at least one of $R_3$ and $R_4$ are each an alkylene oxide group, and that alkylene oxide units in one molecule are 2 to 20 in total number, and
wherein the ethylenediamine compound is in a content of from 0.5 to 8% by weight.

2. The ink-jet recording method according to claim 1, wherein the alkylene oxide group has at least one of an ethylene oxide unit and a propylene oxide unit.

3. The ink-jet recording method according to claim 1, which further comprises a surface-active agent.

4. The ink-jet recording method according to claim 3, wherein the surface-active agent is a nonionic surface-active agent.

5. The ink-jet recording method according to claim 1, wherein the ink-jet recording ink is a thermal ink-jet recording ink.

6. The ink-jet recording method according to claim 1, wherein the recording medium is a cellulose-containing recording medium of 15 cm$^2$ or more in recording area and the ink-jet recording ink is ejected in an ink-application quantity ranging from 0.03 to 30 mg/cm$^2$, by the use of an ink-jet recording head.

7. The ink-jet recording method according to claim 6, wherein the ink-application quantity ranges from 0.1 to 20 mg/cm$^2$.

8. The ink-jet recording method according to claim 6, wherein the cellulose-containing recording medium is plain paper.

9. The ink-jet recording method according to claim 6, wherein the ink-jet recording head is a thermal ink-jet recording head.

10. An ink-jet recording apparatus that performs the ink-jet recording method according to claim 1, comprising an ink-jet recording head which ejects the ink-jet recording ink.

11. The ink-jet recording apparatus according to claim 10, wherein the ink-jet recording head is a thermal ink-jet recording head.

12. The ink-jet recording method according to claim 1, wherein the ink-jet recording ink further comprises at least an ethylene urea as a water-soluble solvent.

* * * * *

UNITED STATES PATENT AND TRADEMARK OFFICE
CERTIFICATE OF CORRECTION

PATENT NO. : 7,306,664 B2
APPLICATION NO. : 11/095589
DATED : December 11, 2007
INVENTOR(S) : Ryota Kato et al.

It is certified that error appears in the above-identified patent and that said Letters Patent is hereby corrected as shown below:

COLUMN 9
Line 56, "described-above" should read --described above--.

COLUMN 13
Line 62, "KawakenFine" should read --Kawaken Fine--.

COLUMN 15
Line 8, "5" should read --4--.

Signed and Sealed this

Nineteenth Day of August, 2008

JON W. DUDAS
*Director of the United States Patent and Trademark Office*